United States Patent [19]
Kannan et al.

[11] Patent Number: 5,329,625
[45] Date of Patent: Jul. 12, 1994

[54] SYSTEM TO SERVICE PROCESSOR INTERFACE FOR A TABLET COMPUTER

[75] Inventors: Krishnamurthi Kannan, Yorktown Heights, N.Y.; Kyriakos Leontiades, Boca Raton, Fla.; Frank P. Novak, Park Ridge, N.J.; Vikram Sharma, Pleasantville, N.Y.

[73] Assignee: International Business Machines Corp., Armonk, N.Y.

[21] Appl. No.: 869,278

[22] Filed: Apr. 15, 1992

[51] Int. Cl.⁵ .............................................. G06F 13/00
[52] U.S. Cl. ..................................................... 395/275
[58] Field of Search ............... 395/155, 275; 345/179, 345/173; 364/705.03

[56] References Cited

U.S. PATENT DOCUMENTS

5,148,155  9/1992  Martin et al. ....................... 345/173

*Primary Examiner*—Robert L. Richardson
*Attorney, Agent, or Firm*—George E. Grosser; Douglas R. McKechnie

[57] ABSTRACT

A digitizer tablet computer has a host processor connected to a service processor which, in turn, is connected to a digitizer controller and to a power subsystem microcontroller whereby primary control of a keyboard, a digitizer, and a power subsystem is off loaded from the host processor to the service processor. The host processor communicates with the service processor through an interface comprising a status register, an input buffer and an output buffer through which host commands and data are transferred. The digitizer produces coordinate data that is initially processed in the service processor before being passed on to the host processor. The host processor is interrupted to receive the processed data and executes in a tight loop until a predetermined amount of processed data is received.

14 Claims, 3 Drawing Sheets

SYSTEM TO SERVICE PROCESSOR INTERFACE FOR A TABLET COMPUTER

FIELD OF THE INVENTION

This invention relates to the field of portable, battery operated tablet computers. More specifically, the invention relates to an improved interface between a host or main processor and a service processor that not only controls a digitizer but also a power subsystem and an optional keyboard.

RELATED APPLICATIONS

The following applications are related:
(1) Application Ser. No. 07/779,486, filed Oct. 18, 1991, by Alfonso et al, for "PEN BASED COMPUTER".
(2) Application Ser. No. 07/870,124, filed Oct. 16, 1992, by C.D. Jones et al, for "A SYSTEM FOR DISTRIBUTED POWER MANAGEMENT IN PORTABLE COMPUTERS".
(3) Application Ser. No. 07/869,403, filed concurrently herewith, by L. Gladstein et al, for "BATTERY OPERATED COMPUTER HAVING IMPROVED BATTERY GAUGE AND SYSTEM FOR MEASURING BATTERY CHARGE".
(4) Application Ser. No. 07/869,411, filed concurrently herewith, by L. Gladstein et al, for "BATTERY OPERATED COMPUTER HAVING IMPROVED BATTERY MONITOR AND CELL REVERSAL PROTECTION CIRCUIT".

BACKGROUND OF THE INVENTION

A portable, battery-operated digitizer tablet computer has been designed which includes a main or host processor that executes one or more application programs under a pen oriented operating system. The computer includes a digitizer coupled with a display that is intended to be the primary output device for interacting with a user. A pen or stylus produces a magnetic field which is sensed by a digitizer to provide signals representing the position of the stylus. The stylus is used as the primary input device for entering information, including handwriting, into the computer. The analysis of handwriting requires a high precision digitizer which in turn generates a multiplicity of coordinate data and thereby creates a heavy signal processing load. To meet this load, the computer has distributed processing in which the initial handling of digitizer information is off loaded onto a service processor from the main processor. The service processor is also used to control a power subsystem and a keyboard that can optionally be connected to the computer. The present invention is directed to the interface between the host processor and the service processor which interact to control operation of the various computer components while permitting digitization to be done rapidly and in an efficient manner.

SUMMARY OF THE INVENTION

In accordance with one of the features of the invention, a service processor (SP) controls a keyboard, a digitizer, and a power subsystem. The SP interfaces with a host system over a standard keyboard controller interface modified to support the digitizer and the power subsystem. The SP interfaces with a keyboard over a standard keyboard interface, with a stylus/digitizer over an interrupt driven serial interface, and with a power subsystem over a polled serial interface similar to the keyboard interface.

In accordance with another feature of the invention, the interface includes three registers (an output buffer, an input buffer, and a controller status register) used to transfer keyboard data, digitizer data and command response data from the SP to the system processor, to send commands to the SP and 'data' (which are really keyboard commands) directly to the keyboard. The controller status register is read by the host but its bits are set by the SP to reflect different conditions.

In accordance with still another feature of the invention, a digitizer produces coordinate signals representing the position of the stylus. The coordinate signals are initially processed by the service processor which in turn interrupts the host processor to send processed coordinate data to the host through the service processor interface at a rate of interrupts less than that which would be required if the data were sent directly from the digitizer to the host.

DRAWINGS

Other objects and advantages of the invention will be apparent from the following description taken in connection with the accompanying drawings wherein.

DETAILED DESCRIPTION

The following description is divided into sections that proceed from a more generalized description of the digitizer tablet computer, through a general description of service processor operations, and finally to specific descriptions of handling the flow of coordinate data from the digitizer.

DIGITIZER TABLET COMPUTER

Figure 1:
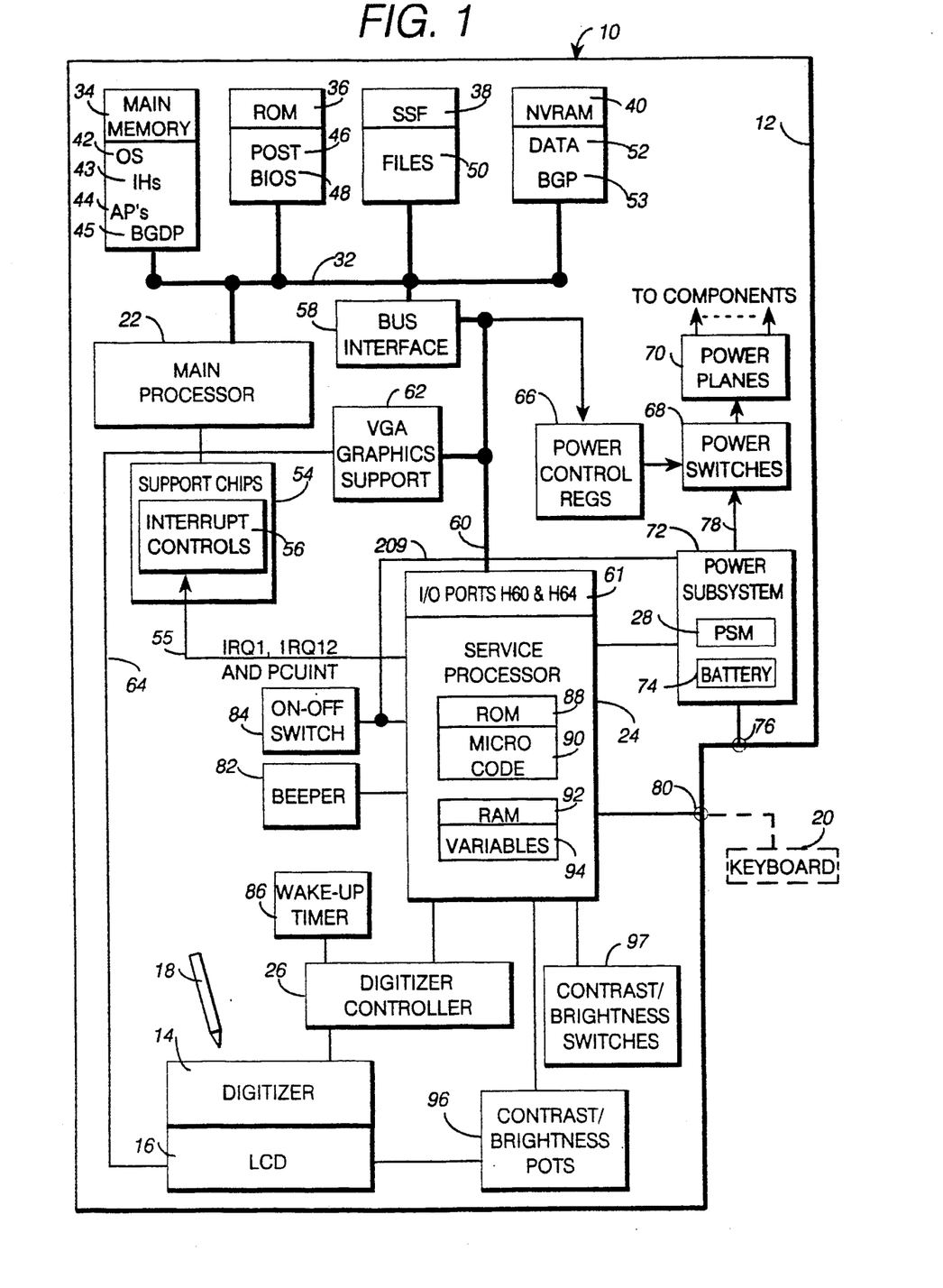
FIG. 1 is a schematic diagram of a digitizer tablet computer embodying the invention.

Referring now to the drawings, and first to FIG. 1, reference numeral 10 denotes a digitizer tablet computer (DTC) that includes a casing 12 for housing the various components of the computer. DTC 10 has a size and a weight that permit a user to readily carry computer 10 from place to place. Housing or casing 12 may have an appearance such as that covered by the above-mentioned related design patent application. DTC 10 includes a digitizer 14 mounted beneath a backlighted liquid crystal display (LCD) 16, and a pen or stylus 18, which form the primary input/output means for entering information into and getting information out of the computer. DTC 10 also includes means for connection to other I/O devices for use at locations where it is convenient to do so. For example, an optional keyboard 20 may be used at a home or office location but not out in the field. Computer 10 may also include system I/O (not shown) such as a SCSI diskette port, a parallel port, an RS 232 serial prot, and a data/facsimile modem with an RJ11 connector.

Stylus 18 is the primary input device and is battery operated, cordless, inkless pen or stylus 18 includes a movable tip that closes a switch (elements not shown) when brought into contact with the upper surface of the LCD. Stylus 18 generates a magnetic field that is sensed or picked up by digitizer 14 and translated into signals representing X,Y coordinates indicative of pen position or location. The frequency of the field is different when the switch is open than when the switch is closed so the digitizer can distinguish between "proximity" coordinates and "pen down" coordinates. Computer 10 then operates the LCD, in a manner described in more detail hereinafter, to activate pixels close to the pen position so that the user perceives that he or she is actually writing with the pen. As a result of this mode of input, the system may also be referred as a pen computer. Digitizer 14 includes a sensing mechanism (not shown) having a grid of conductive loops. Loop currents are induced by the magnetic field of the stylus and vary dependent upon the stylus position. The currents are analog and converted to digital values and analyzed by digitizer controller 26 which deduces the stylus position based on the distribution of currents in the loops. It sends the stylus coordinates to routine 104 for transmission to the service and host processors.

DTC 10 includes four different programmable digital microprocessors or microcontrollers comprising a host or main processor 22, a service processor (SP) 24, a digitizer controller 26, and a power subsystem microcontroller (PSM) 28, which perform various distributed functions or operations in a manner discussed in more detail hereinafter. Processors 22, 24, 26, and 28 are preferably respectively implemented with the following commercially available modules: an Intel 80386SX microprocessor, a National Semiconductor HPC 46064 high performance microcontroller, a NEC 78C10 digitizer controller, and a Signetics 87C752 microcontroller.

Main processor 22 is connected by a local bus 32 to a main memory 34, a read only memory (ROM) 36, a solid state file (SSF) 38, and a non-volatile random access memory (NVRAM) 40. Main memory 34 is implemented as a dynamic random access memory (DRAM), and provides volatile storage of an operating system (OS) 42 and application programs (Aps) 44, such programs being executable by processor 22. OS 42 includes interrupt handlers (Ihs) 43. Aps 44 includes a battery gauge display program (BGDP) 45 that receives battery gauge information and displays it on LCD 16. ROM 36 permanently stores programs such as a power-on self test (POST) program 46 and a basic I/O services (BIOS) 48. SSF 38 operates with low power consumption relative to a hard disk and stores files 50 of the type typically stored on a hard disk. For example, OS 42 and Aps 44 are also stored therein and loaded therefrom into main memory for execution from main memory 34. NVRAM 40 may be implemented in CMOS technology and includes a lithium battery (not shown). Thus the data 52 stored in 40 is not lost when battery 74 is removed or fully discharged. Data 52 includes battery gauge parameters (BGP) 53.

Main processor 22 is also connected to a plurality of commercially available support chips 54 which include interrupt controls 56. While controls 56 handle other interrupts commonly directed to processor 22 (the details not being germane to the invention), controls 56 receive two interrupts related to the invention in a manner described in more detail hereinafter. The interrupts are PCUINT, IRQ12, and IRQ1 which are transmitted to controls 56 from service processor 24.

Local bus 32 is connected through a buffer or bus interface 58 to a bus 60 which is connected to service processor 24, VGA graphics support 62 and power control registers (REGS) 66. Such busses and buffers connect the main processor to such elements whereby the main processor controls the operation of LCD 16 and the distribution of power through the settings of regs 66, and operates support processor 24 as a slave device in a manner described in more detail hereinafter. VGA graphics support 62 is connected by line 64 to LCD 16. The various screens presented on LCD 16, including the "writing" produced by stylus 18, are thus controlled by the main processor.

A power distribution system includes power control regs 66 that are connected to and control the opening and closing of power switches 68 which receive power over bus 78 from a power subsystem (PS) 72 and selectively deliver such power to power planes 70. The various components of the system are respectively connected to different ones of planes 70. Power supply includes PSM 28 and a rechargeable, nickel/cadmium battery 74. Power supply 72 is also connected to a connector 76 for receiving an adapter (not shown) that provides DC power from an external source for charging the battery and operating the computer. When the adapter is plugged in, DTC 10 operates under external power and battery 74 is charged if needed. Power control regs 66 are connected to bus 60 and are addressable so that host processor 22 can selectively set the registers to control or turn switches 68 on and off and execute power up and power down sequences for power management operations.

SERVICE PROCESSOR

Service processor 24 is connected to a connector 80 which allows a keyboard 20 to be attached to computer 10 and operated under the control of the service processor. Processor 24 is also connected to a speaker or beeper 82 and an on/off switch 84. Beeper 82 operates under the control of processor 24 and produces an alarm sound indicating among other things when the charge in battery 74 is low. Switch 84 is user operated and provides the means for selectively turning computer 10 on and off and causing different events to occur dependent upon the power states and status of the computer. Computer 10 has four power states, namely, normal power, idle power, sleep power and zero power states. The action of switch 84 is part of the power management facility incorporated into computer 10 to extend the battery time of operation of computer 10. Such facility is described in more detail in the above mentioned related application (2) and operates in such fashion that clock rates may be changed and the entire system put into a sleep state when inactive to conserve power and various sections of the logic and I/O devices may be powered off when not in use.

Service processor 24 includes a ROM 88 for storing microcode 90 and a RAM 92 for storing variables 94 generated and used while the microcode routines are executed by processor 24. Also connected to processor 24 are potentiometer or pots 96 and switches 97 for controlling brightness and contrast in LCD 16. The user can increase and decrease brightness and contrast by manipulating the switches.

SP 24 controls keyboard 20, digitizer 14, system buttons comprising switch 84 and pots 96, and power subsystem 78. SP 24 interfaces with the host processor over bus 60 via a standard PS/2 keyboard controller interface modified to support the digitizer and power subsystem. SP 24 interfaces with host processor 22 through a PS/2 keyboard interface as more fully described in the above related application (3), with keyboard 20 over a standard PS/2 keyboard interface, with digitizer 16 over an interrupt driven serial interface, and with power subsystem 78 over a polled serial interface similar to the keyboard interface. Main processor 22 offloads to SP 24 much of the I/O intensive processing needed to manage the keyboard, digitizer and power subsystem interfaces. SP 24 also assists the host processor with power management and supervises the system while the main processor is sleeping.

Figure 2:
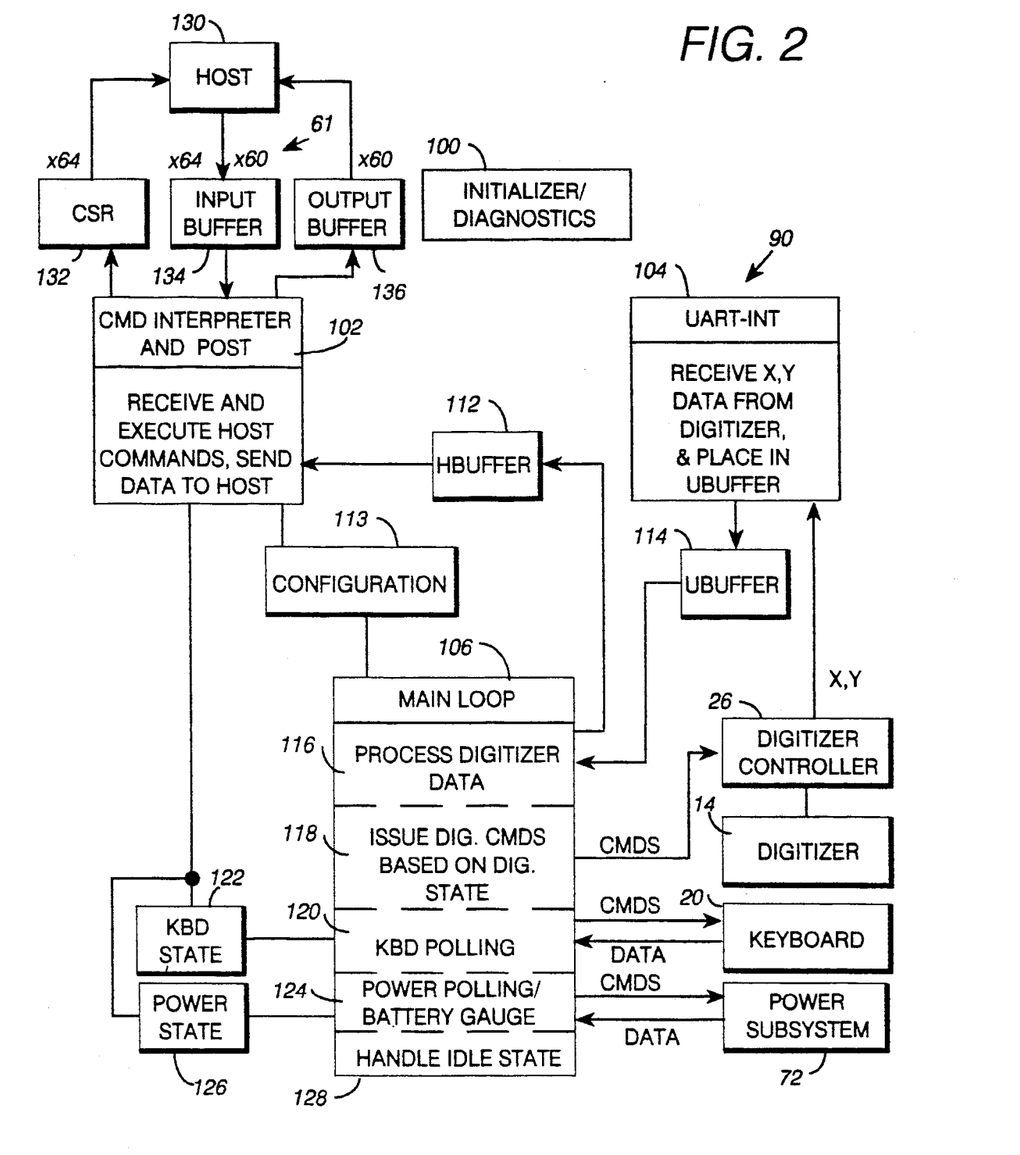
FIG. 2 is a schematic diagram illustrating the general operation and interaction of a support processor and other components shown in FIG. 1.

FIG. 2 illustrates service processor routines defined by microcode 90 and related hardware. The routines are illustrated in boxes having uniform line widths, while the hardware is illustrated in shadowed boxes. Such routines include an initializer/diagnostics routine 100, a command interpreter and post routine 102, a UART-interrupt (INT) routine 104, and a main loop routine 106. The general operation of the various routines will now be described. Initializer and diagnostic routine 100 is performed when the computer is initially turned on from a zero power state. The routine initializes various components and performs power-on diagnostics. Upon successful completion thereof, DTC 10 is set to its normal power state where full operations can proceed. Routine 102 receives, interprets and executes host commands, handles host data that must be sent to the keyboard, and transmits or posts data between the SP and the host. Such data includes digitizer data from HBUFFER 112, configuration data from configuration register 113, and keyboard and power state data from registers 122 and 126. Routine 102 interfaces SP 24 with I/O ports 61 and a host system 130 that comprises main processor 22 and support chips 54 (FIG. 1). I/O ports 61 comprise a controller status register (CSR) 132, an input buffer 134 and an output buffer 136.

UART-INT routine 104 receives information (X,Y coordinates or command responses) from digitizer controller 26 and stores them in UBUFFER 114 for later processing by a process digitizer data routine 116 in main loop 106. Main loop routine 106 performs background processing and loops through a series of routines 116, 118, 120, 124, and 128. Routines 116 formats and filters the digitizer coordinates and places the results in HBUFFER 112 for transmission to the host computer. Routine 118 issues various digitizer routines based on the state of the digitizer. Routine 128 does any state transition processing required to switch between states when entering and exiting idle mode. Routine 120 is a keyboard polling loop that monitors a keyboard interface clock (not shown) and receives keyboard data including scan codes and command response data. Lastly, routine 124 is a power polling loop that monitors a power interface clock (not shown) and receives power subsystem data over a serial link, such data including power packets described in detail below. Routine 124 transfers or clocks in data using a power clock generated by PSM 28. Routine 124 also functions as part of a battery gauge that indicates how much energy remains in battery 74 and how much time remains until the battery charge is depleted. Further details of the battery gauge operation are described in related application (3) above.

As discussed generally above, the interface between host system 130 and SP 24 comprises three 8-bit registers: output buffer 136, input buffer 134, and CSR 132. Such hardware is similar to a standard PS/2 keyboard controller interface and is implemented using a built-in Universal Peripheral Interface (UPI) of the specific microprocessor forming the service processor, with some external glue logic. The output buffer is written by SP 24 and read by the host system at address x60; it is used to transfer keyboard data, digitizer data and command response data from the SP to the system processor. The input buffer is written by the host at address x60 (for data) or address x64 (for commands) and read by SP; it is used by the system processor to send commands to the SP and 'data' (which are really keyboard commands) directly to the keyboard; most of the commands issued by the system via writing to address x64 do not require a response by SP; some commands do require response data; SP places response data to the output buffer and the host reads it via port x60. The Controller Status Register is read by the host at address x64; some of its bits are written by hardware (e.g. the 'buffer full' bits when input buffer or output buffer are read or written), others are written by the SP microcode; the bits signal whether the input and output buffers are empty or full, whether the SP detected internal errors or timeouts, whether the byte in the input buffer is a host command byte (to be executed by SP) or a 'data' byte (to be passed to the keyboard without interpretation), etc.

CSR can be read by the host at address x64. Bit definitions in the CSR are:

Bit 7: SP error. Any exception worth reporting to the host detected within the SP will cause this bit to be set. The host can find out the error (or exception) code by sending a 'read error code' command. The SP sets this bit every time it sends data to the host (loads the output buffer). A particular error is only reported once. For example, if the SP detects a power subsystem timeout, it will set the error bit to report the error with the next (say) digitizer or keyboard transmission, but subsequent transmissions to the host will have the error bit cleared, unless SP polls the power subsystem and it times out again.

Note that SP conditions requiring immediate host attention (such as battery warning) are communicated to the system NOT via the keyboard/digitizer interrupt, but via PCUINT, which causes a special host power management interrupt. The host can then find out the reason for the PCUINT by issuing the 'read power state' command; since this command requires that the SP send data to the host via the output buffer, the host can also find out if there are any errors in the SP by checking the SP error bit.

Bit 6: General Time-out. Any SP exception related to an internal time-out such as 'keyboard did not finish its transmission in time' etc will also result in setting of this bit. Time-outs are generally recoverable, but if they keep reoccurring they signify problem with SP or the device it controls. If a timeout is detected SP error is also set. The host can determine the timeout (e.g. keyboard or digitizer or power subsystem) by sending a 'read error code' command. The rules for setting and clearing the 'General Time-out' bit are the same as those for the 'SP error' bit Bit 5: Digitizer data available. This bit is set by SP right before interrupting the host (with IRQ12) after placing the first byte of a digitizer data transmission in the output buffer.

Bit 4: Always set to 1.

Bit 3: Command/Data. 1 means the data in the input buffer (INBUF) is a host command. 0 means it is host data. This bit is set by the hardware when the host writes to address x64 (bit set to 1) or address x60 (bit set to 0). SP decodes and executes host commands and passes host data unchanged to the keyboard.

Bit 2: System Flag. This bit can be written by the host indirectly through writing the corresponding bit in the Controller Command byte (command x20). The SP does nothing with this bit other than write it as the host commands. It can be used by the host to 'mark' the SP and then check the 'mark' by reading the Controller Status Register (without a need to issue a command).

Bit 1: Input Buffer Full. This is set by the hardware when the host writes a byte into the INBUF (via address x60). The SP uses it to determine if the INBUF is full. The hardware clears the bit when the SP reads INBUF.

Bit 0: Output Buffer Full. This is set by the hardware when the SP writes a byte into the OUTBUF. The host may use it to determine if the OUTBUF is full. The hardware clears the bit when the host reads OUTBUF (via address x60).

Input and Output Buffers 134 and 136 are identical to the PS/2 keyboard controller input and output buffers and are referred to herein as INBUF and OUTBUF. The viewpoint of such names is from SP (OUTBUF is where SP writes data for the host, INBUF is where the host writes data or commands for the SP).

Before sending to the host keyboard or digitizer data, SP ensures that the output buffer is empty. However, SP does not check if output buffer is empty when it puts data there in response to host commands. It is a host responsibility to ensure that query commands that require SP to respond with information bytes are not issued while there is a possibility of keyboard or digitizer data generation.

If SP interrupts are enabled, SP interrupts the host after it places a byte in the output buffer, except during digitizer data transmission, when it only interrupts on the first byte.

SP gives the host access to the 'Keyboard Data' line via the 'Read Input Port' command (xC0).

The following output port bits defined in the PS/2 keyboard controller are supported by SP. The output ports can be accessed by the host via the 'read output port' 'write output port', and 'pulse output port' commands.

Bit 7: Reserved.
Bit 6: Reserved.
Bit 5: Reserved.
Bit 4: Reserved.
Bit 3: Reserved.
Bit 2: Reserved.
Bit 1: Gate Address Line 20. If this bit is 1, the system address line 20 is prevented from getting to memory, so accesses above 1 MB wrap around to low memory. This bit is set to 0 at power up, and can be modified via command xD1.
Bit 0: Reset Microprocessor.

Host Commands- The system to SP interface is similar to the PS/2 keyboard controller interface modified to handle digitizer data. The key modification is the addition of a protocol to handle fast synchronous transmission of digitizer data to avoid a 'one interrupt per byte' situation which occurs when a keyboard and a mouse share the interface. Interrupt (IRQ12), normally used for a mouse in other systems, is used to notify the host that digitizer data is available. In addition to this new data interchange protocol, commands have been added to manage the digitizer and power subsystem, and all commands to manage the mouse (auxiliary device) have been removed. The following command descriptions assume a knowledge of the PS/2 keyboard controller interface and keyboard operation.

Host commands to the SP can have the following characteristics:

Single byte—These commands are written by the host to port x64.

Multibyte—These commands contain a command code written by the host to port x64, followed by one or more parameter codes written to port x60.

Query—Query commands can be single byte or multibyte. They require that the SP return one or more bytes of response data through its output buffer (system port x60). The host must be very careful when using these commands to avoid conflicts with keyboard and digitizer data that also are transmitted to the host through port x60. Newly defined query commands do not generate an interrupt when placing their response data into the output buffer. Already existing query commands generate IRQ1, if SP interrupts are enabled for compatibility with existing personal computers.

Note that all command codes in this section are hexadecimal. The command list below includes all commands supported by the SP.

20-3F : Read the controller RAM. Same as PS/2. These commands allow the host to read some of the SP RAM bytes; they match the 60-7F commands which allow the host to write these same bytes.

20-Read Controller Command byte. This command allows the host to read the Controller Command byte. The byte is set by the host by the 'Write Controller Command byte' command. The Controller Command Byte has the following bit definitions:

Bit 7—reserved
Bit 6—If this is set to 1, SP translates the keyboard scan codes to scan-code set 1. Otherwise it passes them unchanged to the host. The keyboard defaults to scan-code set 2. The SP initializes this bit to 0.
Bit 5—Disable Digitizer. If this bit is 1, the digitizer is disabled and does not generate data. The SP initializes this bit to 1.
Bit 4—Disable Keyboard. If this bit is 1, the keyboard is disabled and does not generate data. The SP initializes this bit to 1.
Bit 3—reserved
Bit 2—System Flag. The SP initializes this bit to 0.
Bit 1—Enable Digitizer Interrupt. If this bit is 1, digitizer data will cause an interrupt (IRQ12 with bit 5 of the Controller Status Register set). If this bit is 0, digitizer data is still placed in the output buffer with bit 5 of the Controller Status Register set, but no interrupt is generated; the host must poll very fast or else data will be lost in this mode of operation. The SP initializes this bit to 0.
Bit 0—Enable keyboard interrupt. The SP initializes this bit to 0. If this bit is 1, keyboard interrupts are enabled; the SP generates a keyboard interrupt (IRQ1) every time it puts keyboard or command response data into its output buffer. For newly defined query commands that generate response data (such as 'read temperature') SP does not generate an interrupt when it places the response data in the output buffer.

21-3F-Reserved 60-7F: Write the SP RAM. These commands allow the host to write the first 64 bytes of the SP RAM. The host first writes the command to x60 and then follows with the byte to be written after SP takes the command.

60—Write Controller Command Byte. The host may send this command to enable or disable digitizer and keyboard by manipulating the appropriate bits and to enable or disable SP interrupts. Note that there are other commands to set or clear these bits individually.

"8X" commands have been added to support the digitizer. "Discard window" in the command descriptions below refers to a square window centered around the last point reported to the host, the window being formed by points stored in RAM 92 (FIG. 1). If the discard window is active, all digitizer points falling inside this window are discarded by the SP. A point falling outside the window is reported to the host and redefines the center of the window. Transition points, if reported, also redefine the center of the window. The dimensions of the window are given to the SP via the 'set discard window size' command.

A "proximity point" is a digitizer x,y coordinate pair generated while the stylus or pen is hovering above the LCD within proximity distance (about 0.25") but not touching the screen. "leaving proximity" is an event that occurs when the pen is withdrawn beyond proximity distance from the screen. The digitizer then produces a single "out of proximity" point. "Entering proximity" occurs when the pen approaches the screen to within the proximity distance. The digitizer prefaces such event by generating an "out of proximity" point and following this with "in proximity" points.

The digitizer support commands are:

80 : Interrupt on all points. Any digitizer points will cause an interrupt. These include transition events (pen up, pen down, leaving proximity, or entering proximity) as well as any points that fall inside or outside the current discard window. This command is equivalent to a command that would have set the discard window inactive. The window size is not affected by this command.

81 : Mask ON/OFF switch. This command tells the SP to mask the ON/OFF switch interrupt. SP will unmask the interrupt (and allow a pending interrupt to take effect) when it receives command xA3 or when it unilaterally rearms the ON/OFF switch.

82 : Set discard window active. This command asks the SP to interrupt on any transition points (pen up, pen down, leaving proximity, or entering proximity) as well as any points that fall outside the current discard window. Non-transition points inside the current discard window are discarded. The first point reported following execution of this command establishes the discard window center. A pen down point is a digitizer x,y coordinate pair generated while the stylus was touching the screen. A proximity point is a digitizer x,y coordinate generated while the stylus was hovering above the screen within proximity distance.

83 : Set discard window size. This command determines the size of the square discard window within which digitizer points will not be reported to the host (if it's active). The window is centered on the last digitizer point reported. A point whose type is different than the previously reported point is always reported (e.g. if a pen down point is followed by a pen up point the pen up point is always reported even though it may fall within the current discard window); any point reported redefines the center of the discard window. The window size command must be followed by 2 bytes that determine its side in digitizer resolution. The low order byte should be sent before the high order byte. The default window size is 0 (all points reported, if enabled).

84 : Set Sampling rate. This specifies how frequently points are recorded in the digitizer buffer, Note that this does not affect the internal sampling rate used by the digitizer. Two parameter bytes must follow this command specifying the rate. The low order byte must precede the high order byte. Valid range is preferably 23 to 270 samples per second. Values beyond 270 results in 270 samples being reported. Values below 23 result in 23 samples per second being reported, The sampling rate is set to 270 samples per second at SP initialization.

The SP approximates the sampling rate requested by the host. The goal is to give the host points that are evenly spaced in time. Since the sampling rate of the digitizer is fixed, SP drops n points for every point it reports to the host in order to achieve evenly spaced points. This results in the following correspondence between requested sampling rates and resulting sampling rates:

| Requested Sampling Rate (samples/sec.) | Service Processor Action (discard points) | Resulting Sampling Rate (samples/sec.) |
| --- | --- | --- |
| 202 or greater | None | 270 |
| 112-201 | 1 out of 2 | 135 (270/2) |
| 78-111 | 2 out of 3 | 90 |
| 60-77 | 3 out of 4 | 67.5 |
| 50-59 | 4 out of 5 | 54 |
| 42-49 | 5 out of 6 | 45 |
| 37-41 | 6 out of 7 | 39 |
| 32-36 | 7 out of 8 | 34 |
| 29-31 | 8 out of 9 | 30 |
| 26-28 | 9 out of 10 | 27 |
| 24-25 | 10 out of 11 | 24.5 |
| 23 or lower | 11 out of 12 | 22.5 |

Transition points are not discarded when adjusting the sampling rate, so if there are a lot of transition points the sampling rate seen by the host may be higher than shown in the table above. A transition point restarts the discard count. For example, if SP is discarding 9 out of 10 points, if the 5th discard point happens to be a transition point, SP will report it and reset the discard count to 0 (i.e. will discard the next 9 points if they are not transition points).

If the discard window is active, SP first discards to adjust the sampling rate, then it discards any points falling within the discard window.

88 : Enable proximity reporting. This command allows proximity points to be reported to the host.

86 : Disable proximity reporting. This command disables proximity point reporting. Proximity points already in SP buffers are not flushed. To flush SP's buffers the host must issue the 'disable digitizer' command (xA7).

87 : Set power on state. This command sets the internal SP configuration parameters to their initialization values and initializes internal buffers and variables (clearing any pending points, for example). Keyboard and digitizer interrupts are disabled, and discard window size is set to 0. In addition, when SP receives this command it polls the power subsystem for the latest power and environment state values. This command may take from 20 to 80 msec, depending on power subsystem response.

A1 : Disable SP data interrupts. This commands the SP not to assert the IRQ1 OR IRQ12 when it puts data into its output buffer. The host must poll OUTBUF full bit and read the output buffer regularly to avoid SP buffer overrun and data loss. The host can select this mode of operation after it disables keyboard and digitizer data production, e.g. to issue a new group of initialization commands without interference from keyboard or digitizer data; a better way to accomplish this is via the 'disable devices'—'restore devices' protocol described under command xC6.

A2 : Enable SP data interrupts. This commands the SP to assert IRQ1 or IRQ12 when it puts data into its output buffer. The host must respond to SP interrupts in less than 60 ms; otherwise some digitizer data may be lost under worst case conditions (maximum sampling rate and no discard window). Response time to IRQ12 must be much quicker (on the order of a millisecond or two) to achieve a smooth digitizer to user interface.

A3 : Rearm ON/OFF switch. This command tells the SP to clear the ON/OFF switch latch so that a subsequent depression of the switch can cause the latch to be set and cause a PCUINT interrupt.

A4–A6: Reserved

A7: Disable Digitizer. This command sets bit 5 of the Controller Command byte to 1, disabling digitizer point production. When the SP receives this command, it clears all digitizer data buffers. On power up the SP sets this bit, disabling the digitizer.

A8 : Enable Digitizer. This command clears bit 5 of the Controller Command, enabling digitizer point production.

A9 : Test Digitizer. This command causes the SP to send a test command to the digitizer micro. The test result is placed in the output buffer and has the following meaning:
x00—No error detected
x01—Parity or other error in digitizer communication
x02—Digitizer does not respond to commands.
x03—Digitizer micro detected internal digitizer error
other values reserved AA : Self-Test. This command causes the SP to run its internal diagnostics. If no errors are detected SP places a x55 in the OUTBUF. At the end of Self-Test, SP is at its POR initialization state. The SP starts its self test immediately after power up without waiting for the host to issue 'self-test'. The host should issue self-test sometime during the host POST, to which the SP responds with the test results without actually redoing the test. If the host issues subsequent 'self-test' commands to the SP, the SP repeats the test. Part of the test involves polling the power subsystem for environment and power information. The test lasts approximately 200 ms.

AB : Keyboard interface test. This command causes the SP to test the keyboard clock and data lines. The result is placed in the output buffer.

AC: Reserved.

AD: Disable Keyboard Interface. This command sets bit 4 of the Controller Command byte to 1, disabling the keyboard interface.

AE: Enable Keyboard Interface. This command sets bit 4 of the Controller Command byte to 0, enabling the keyboard interface.

B0 : Query Power Environment. This command is followed by a parameter byte that specifies the particular power environment information needed by the system. When SP places the response data into the output buffer it does not generate an interrupt. The SP is continuously polling the power subsystem for data. New data eventually overwrite old data. If the host delays its response to a PCU interrupt for more than 100ms, the information in the power_state byte may not be identical to the information that caused the PCUINT. If the SP does not yet have valid power subsystem data, it sets the error bit and returns x00; this may happen if SP has not been able to obtain PS data following initialization.

BA : Reset VGA. This command causes the SP to generate a 2 microsecond positive pulse on its VGARESET output line. At initialization VGARESET is set low.

BB : SP diagnostics command. This command allows the host to perform specific diagnostic tests for SP subsystem debug purposes and also allows the system to setup and read power subsystem parameters. The host follows this command with a single parameter byte written to port x60 that specifies the particular diagnostic test required. After decoding the command code SP, sits in a tight loop waiting for the parameter byte and ignoring any input from keyboard, digitizer or power subsystem.

BC : Power Subsystem Command. This command is followed by a parameter byte and asks the SP to perform a power subsystem related task.

C0 : Read Input Port. This command causes the SP to put the current state of the Keyboard data line into bit 0 of OUTBUF (1 means data line is high, 0 low). The other OUTBUF bits are set to 0.

C1–C5 : Reserved

C6 : Disable Devices. This command saves current device state and then disables the devices and the SP interrupts. PCUINT resulting from depression of the ON/OFF switch, remains enabled. When SP receives this command it:
(1) Saves the current values of the 'disable digitizer' and 'disable keyboard' bits of the Controller Command byte.
(2) Sets the 'disable digitizer' and 'disable keyboard' bits to 1, thus disabling the devices. Note that unlike the 'disable digitizer' command, the internal SP digitizer buffers are not cleared, and there is no loss of information.
SP guarantees that after it reads the 'Disable Devices' command from INBUF (i.e. Input Buffer full bit in Controller Status Register is 0), no more device data will be generated in port 60, until the system explicitly re-enables the devices or issues the 'Restore Devices' (C8) command.

(3) As soon as SP reads the 'disable devices' command, it enters 'command mode'. In this mode, SP will not generate interrupts when it places command response bytes into the output buffer (system port x60). In 'command mode' SP will not interrupt when it returns the results of system commands requiring response bytes. The SP is dedicated to processing system commands and does not check the power subsystem, nor does it generate PCUINT (with the exception of on/off button depression). System Query commands to the SP in this mode take only a few microseconds per command. The system processor should stay in a tight loop alternatively issuing query commands and waiting for responses by monitoring the input buffer and output buffer full bits.

This command should be paired with the 'Restore Device' (C8) command. SP treats C6 as a no-op if it receives C6 while in command mode. his command in conjunction with 'Restore Devices' and 'Restore Output Buffer' can be used by the system to safely issue query commands to SP without fear that query info returned by SP through port x60 will be mixed up with device data.

C7 : Restore Output Buffer. When SP receives this command it waits for a parameter byte, and after receiving it, it places the parameter byte in the output buffer without generating an interrupt.

C8 : Restore Devices. When SP receives this command, it restores the state of the 'disable digitizer' and 'disable keyboard' bits of the Controller Command byte and exits command mode. The bits were saved by a preceding C6 command. This command should be paired with the 'Disable Devices' (C6) command. If there is no previously issued C6 command (i.e. SP is not in command mode), SP treats C8 as a noop.

C9 : Read Error Code. This command allows the host to determine the nature of an SP exception. When SP discovers an exception either during normal operation or during execution of its diagnostics, it sets the error bit in the Controller Status Register. The host can determine the type of the exception by issuing this command to SP. If the SP is still alive it will respond with the error code. The host reads the data from port 60.

CA : Write Contrast. This command allows the system processor to set the current contrast potentiometer value. The system should restore contrast from system NVRAM after power up to restore the user setting.

CB : Write Brightness. This command allows the system processor to set the current brightness potentiometer value. The system should restore brightness from system NVRAM after power up to restore the user setting.

CC : Read Contrast This command allows the host to read the current contrast potentiometer value. A single byte is returned by SP. The host should store this in NVRAM before powering down the core power plane to preserve the user setting. When SP places this command's data into its output buffer, it does not generate an interrupt.

CD : Read Brightness This command allows the host to read the current brightness potentiometer value. A single byte is returned by SP. The host should store this in NVRAM before powering down the core power plane to preserve the user setting. When SP places this command's data into its output buffer, it does not generate an interrupt.

D0 : Read Output Port. SP will return zeros for all bits except Bits 0, 1, 6, 7 which reflect the state of Reset Microprocessor, Gate Address Line 20, Keyboard clock and Keyboard Data respectively.

D1 : Write Output Port. SP will only write bits 1, 6, 7. The other bits are ignored. If the host wants to generate a hardware reset, it should use command FE.

D2 : Write Keyboard Output Buffer. Take the byte written by the host to the input buffer, wrap it back to the output buffer and generate an interrupt.

D3–D4: Reserved

E0 : Read Test Inputs. This command causes SP to read the keyboard clock and output a byte whose bit 0 reflects the level of the clock.

FE : Pulse Output Port. This command causes SP to pulse the -RESETCPU line for 6 microseconds. This causes a system hardware reset.

F0–FD, FF: Reserved.

SP to Host frame formats—Digitizer points and other information is stored as variable length frames in a circular buffer in the SP on board RAM. Each frame has a single byte header code followed by 0 or 4 parameter bytes depending on the header code. There are two types of digitizer points: pen down points and proximity or pen up points. These are:

0x80 <x0> <x1> <y0> <y1>: Out of proximity frame. This denotes that the pen just went out of proximity. x and y are digitizer precision coordinates; their accuracy is not as good as the 'in proximity coordinates'. See pen proximity point (x81) for coordinate format. The first pen up or pen down point following this signifies entry into proximity.

0x81 <x0> <x1> <y0> <y1>: Proximity or pen up digitizer point. x and y are digitizer precision coordinates. The digitizer is set to report proximity points when the pen hovers up to 0.25" above the writing surface. The first pen up digitizer point following a pen down point signifies the end of a stroke and is a 'pen up event'. The format of each coordinate is:

x0: X7 X6 X5 X4 X3 X2 X1 X0
x1: 0 X13 X12 X11 X10 X9 X8

Xn is the nth bit in the sixteen bit coordinate (X0 low order bit).

0x83 <x0> <x1> <y0> <y1>: Pen down digitizer point. x and y are digitizer precision coordinates. See pen proximity point (x81) for coordinate format. The first pen down point following a pen up or out of proximity point signifies the start of a stroke and is a 'pen down event'.

0x85: Buffer over-run frame. This can occur any time the SP detects that there is not enough room for digitizer points in its buffer. It means that one or more digitizer points have been lost. In general, this is not a catastrophic condition and should not cause any problems, unless it occurs 'very often'.

Figure 3:
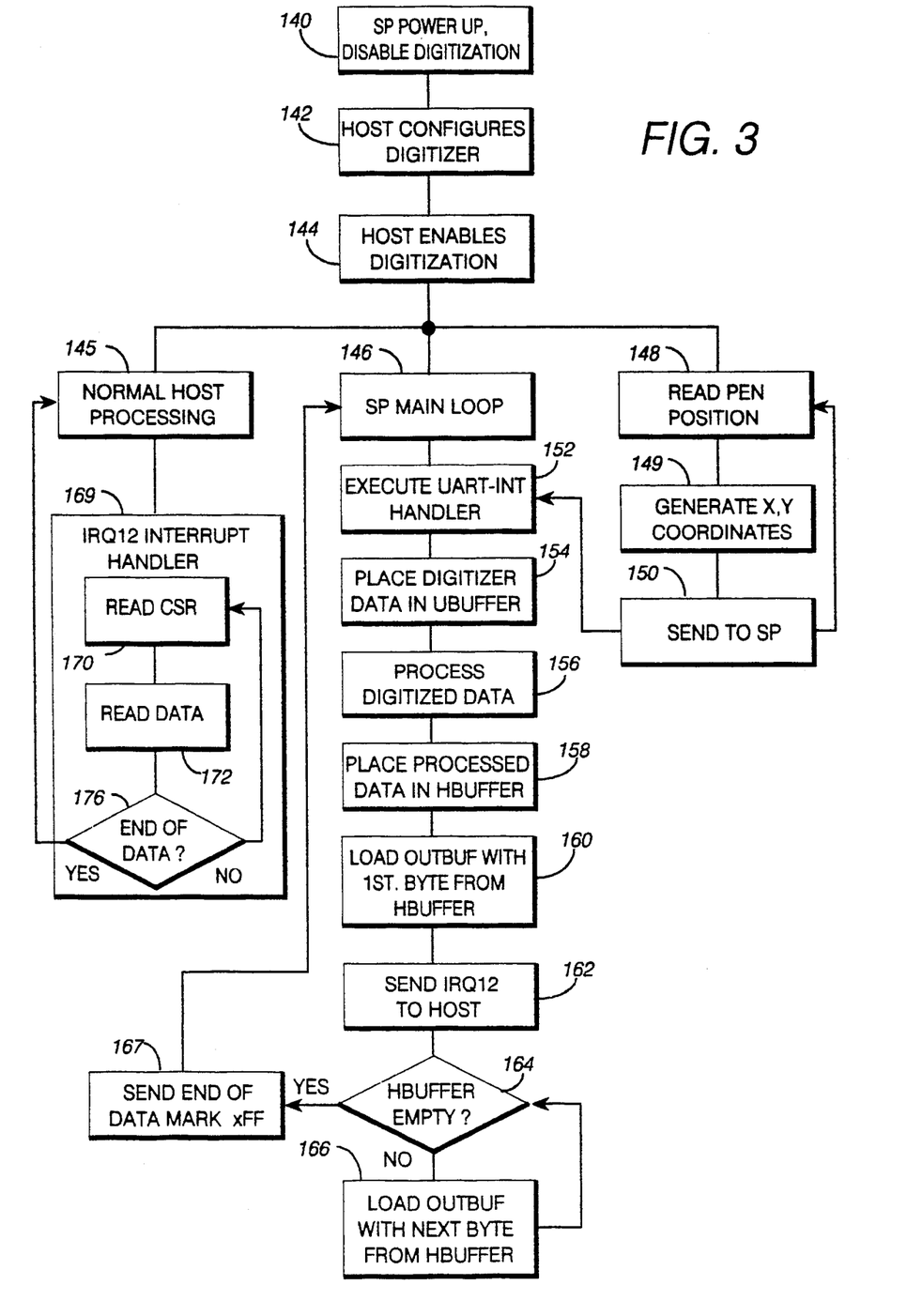
FIG. 3 is a flow chart illustrating operation of the computer shown in FIG. 1.

The digitizing operation of the computer will now be described with reference to FIG. 3. When SP 24 is powered up in step 140, digitizer 14 is disabled. Next, in step 142, the host system 130 sends various commands to SP 24 to configure the digitizer. The commands include one or more of the following commands x80, x82, x83, x84, x85, x86, xBB3a, xBB39, xBB3E, and xBB3F. The host system in step 144 then sends an xA2 command followed by a xA8 command to enable digitizer point production. Once this happens, the host then proceeds with its normal, non-digitization processing in step 145, SP 24 proceeds with its main loop processing in step 146, and the digitizer controller enters a loop 148 awaiting a pen input.

When the pen is brought into proximity to the digitizer, the digitizer reads the pen position in step 148 and sends the positions to the digitizer controller which in step 149, generates digital x,y coordinates for the pen position. Controller 26 then sends the coordinate data to SP 24 by making an interrupt request that is handled by the UART_INT handler. The controller then branches back to step 148 to continue the process or loop of reading the pen position and generating x,y coordinates until the pen is moved out of proximity.

The UART-INT interrupt request is handled in step 152 by routine 104 (FIG. 2) and places digitizer data in UBUFFER 114 in step 154. Once data has been placed in such buffer, SP 24 then processes the data in step 156 to produce processed data that is then sent to the host system. Each processed data point is placed in HBUFFER 112 in step 158. The OUTBUF is then loaded with the first byte of data in the HBUFFER in step 160 which action sets CSR 132 to indicate the presence of such data. Next, in step 162, SP 24 sends interrupt request IRQ12 to the host system. SP 24 then proceeds in step 164 to enter into a loop which determines, by looking at CSR 132, whether the data has been read from the OUTBUF so that the next byte from the HBUFFER can be placed in the OUTBUF until the HBUFFER is empty. Once the HBUFFER has been emptied, step 167 creates an end of data marker XFF and sends it to the host for use in step 176.

When the host receives the IRQ12 request from step 162, the normal host processing is interrupted and an IRQ12 interrupt handler reads the contents of CSR 132 in step 170 and determines the presence of data in the OUTBUF and then reads, in step 172, the data into the host system. As the data is read, hardware resets the CSR to indicate the OUTBUF is empty. The handler then determines if the data that was read is the end of data marker XFF in step 174. If it is not, a branch is made back to step 170 to repeat the process until the HBUFFER is emptied. Then step 176 reads the end of data marker and branches to the normal host processing which then proceeds to activate the LCD screen and indicate thereon the pen position.

SP starts a 20ms timer after it detects output buffer empty (system has read the first byte). If the system does not complete the rest of the transfer before the timer expires, SP aborts the transmission, clears its internal digitizer buffers, and issues an IRQ12 with a single byte 'end of data' XFF in the output buffer. The error bit in the status register will be set and the error code will be x'0D' indicating system digitizer data transfer timeout.

It should be apparent to those skilled in the art that many changes can be made in the details and arrangements of steps and parts without departing from the scope of the invention as defined in the appended claims.

What is claimed is:

1. A digitizer tablet computer comprising:
   a pen actuated digitizer for generating digitizer data indicative of pen position;
   a digitizer controller connected to said digitizer for converting said digitizer data into digital coordinate data indicative of pen position;
   a display for visually indicating representations of pen position;
   a host processor connected to said display for controlling operation thereof;
   a service processor connected to said host processor through an interface comprising an input buffer, an output buffer, and a controller status register (CSR);
   first means connecting said service processor to said digitizer controller for receiving and buffering said coordinate data and transmitting such coordinate data to said service processor for processing;
   second means in said service processor for transforming said coordinate data into processed data;
   and third means for transmitting said processed data from said service processor to said host system through said interface.

2. A computer in accordance with claim 1 wherein:
   said input buffer, said output buffer and said CSR are I/O ports addressable by said host processor, said input buffer being operative to temporarily store data and commands which are written in said input buffer by said host processor and read from said input buffer by said service processor, said output buffer being operative to temporarily store processed data which are written in said output buffer by said service processor and read from said output buffer by said host processor, and said CSR having a plurality of bits selectively settable by said service processor and readable and resettable by said host processor.

3. A computer in accordance with claim 1 comprising:
   said digitizer controller is operative to interrupt said service processor when a coordinate data point is ready to be transmitted to said service processor;
   and interrupt handling means in said service processor operative in response to said interrupt to receive said coordinate data point and temporarily store it in a third buffer.

4. A computer in accordance with claim 3 comprising:
   a fourth buffer connected between said service processor and said output buffer for temporarily storing said processed data for transmission to said host processor through said output buffer.

5. A computer in accordance with claim 4 wherein said processed data being transmitted to said host includes digitizer data points having a format of a header followed by plural bytes defining x,y coordinates.

6. A computer in accordance with claim 5 wherein said header defines the following bytes as pen down points, pen up points, and proximity points.

7. A computer in accordance with claim 4 comprising:
   digitizing means in said digitizer controller for generating said digital coordinate data at a fixed rate;
   and sampling rate control means in said service processor operative to discard data points at a rate predetermined by a rate setting command from said host processor, whereby data can be transmitted to said host processor at a rate less than said fixed rate of said digitizer controller.

8. A computer in accordance with claim 7 wherein said service processor sends an interrupt request to said host processor and said host processor in response to such interrupt reads data from said output buffer, whereby the rate of interrupting said host is determined by said sampling rate.

9. A computer in accordance with claim 5 wherein:
said output buffer is of a size to store a single byte;
said fourth buffer is of a size to store plural bytes of said coordinate data;
said service processor is operative to initially load a coordinate data point in said fourth buffer, transfer successive bytes thereof into said output buffer, and send a interrupt to said host processor when the first byte of coordinate data is placed in said fourth buffer;
and said host processor is operative in response to receiving said interrupt to read successive bytes from said output buffer until said fourth buffer becomes empty.

10. A computer in accordance with claim 9 wherein:
said service processor is operative in response to said fourth buffer becoming empty to write an end-of-data mark in said output buffer;
and said host processor is operative in response to receiving said end-of-data mark to terminate interrupt processing and return to normal host processing.

11. A computer in accordance with claim 1 comprising:
a power subsystem connected to said service processor and including a power subsystem microcontroller (PSM), a battery, a battery charger, and a battery monitor, said PSM being operative to gather data relative to said power subsystem and transmit such data periodically to said service processor.

12. A computer in accordance with claim 11 wherein said service processor periodically polls said PSM to send data concurrently with said service processor handling digitizer originated data.

13. A computer in accordance with claim 2 comprising:
a keyboard connected to said service processor and operating under control thereof;
said service processor being operative to gather keyboard data for transmission to said host processor through said interface, and to receive keyboard commands from said host through said interface for transmission to said keyboard.

14. A computer in accordance with claim 2 wherein one of said CSR bits represents the availability of digitizer data in said output buffer.

* * * * *